(12) United States Patent
Wefers

(10) Patent No.: US 8,151,247 B2
(45) Date of Patent: Apr. 3, 2012

(54) TEST DATA MANAGEMENT

(75) Inventor: Marcus Wefers, Heidelberg (DE)

(73) Assignee: SAP AG, Walldorf (DE)

( * ) Notice: Subject to any disclaimer, the term of this patent is extended or adjusted under 35 U.S.C. 154(b) by 1212 days.

(21) Appl. No.: 11/868,905

(22) Filed: Oct. 8, 2007

(65) Prior Publication Data

US 2008/0086660 A1 Apr. 10, 2008

Related U.S. Application Data

(60) Provisional application No. 60/828,764, filed on Oct. 9, 2006.

(51) Int. Cl.
*G06F 9/44* (2006.01)
(52) U.S. Cl. ......... 717/124; 717/126; 717/127; 717/131
(58) Field of Classification Search .................. 717/124, 717/126, 127, 131
See application file for complete search history.

(56) References Cited

U.S. PATENT DOCUMENTS

| | | |
|---|---|---|
| 6,257,774 B1 | 7/2001 | Stack |
| 6,601,233 B1 | 7/2003 | Underwood |
| 6,810,494 B2 * | 10/2004 | Weinberg et al. ............... 714/46 |
| 6,907,546 B1 | 6/2005 | Haswell et al. |
| 2002/0083213 A1 | 6/2002 | Oberstein et al. |
| 2005/0149868 A1 | 7/2005 | Katayama et al. |
| 2006/0010163 A1 | 1/2006 | Herzog et al. |
| 2007/0088668 A1* | 4/2007 | Larab et al. ........................ 707/1 |
| 2007/0089091 A1* | 4/2007 | Larab et al. .................... 717/124 |

OTHER PUBLICATIONS

Bunte, et al. "Improving the Confidence in Measurement-Based Timing Analysis", 2011, IEEE, p. 144-151.*
Gamma, "Gamma InfoShuttle Data Migration Solutions for SAP", *Gamma, An applimation Company; products; Copyright 2007 Gamma Enterprise Technologies, Inc.*; 2 pages http://www.getgamma.com/pro_ifs.html; retrieved Mar. 20, 2008.
Gamma, "Gamma InfoShuttle Rapid Test", *Gamma InfoShuttle Rapid Test Data Sheet; Copyright 2007 Gamma Enterprise Technologies, Inc.* (4/07); 2 pages Link from http://www.getgamma.com/pro-rt.html; retrieved on Mar. 20, 2008.
Gamma, "Gamma InfoShuttle Suite", *Gamma InfoShuttle Suite Data Sheet; Copyright 2007 Gamma Enterprise Technologies, Inc.*, (5/07); 2 pages; link from http://www.getgamma.com/pro_ifs.html; retrieved Mar. 20, 2008.
Gamma, "Gamma InfoShuttle Test Data Management for SAP", *Gamma, An Applimation Company; Copyright 2007 Gamma Enterprise Technologies, Inc.*; 2 pages http://www.getgamma.com/pro_rt.html; retrieved Mar. 20, 2008.

(Continued)

*Primary Examiner* — Qamrun Nahar
(74) *Attorney, Agent, or Firm* — Blakely, Sokoloff, Taylor & Zafman, LLP

(57) ABSTRACT

Methods and apparatuses enable generating test content for test system from an executed transaction of an execution system. The data resulting from the execution of the transaction in the execution system is accessed and used to generate test content for a test case. The test case can include the transaction data unmodified, or the transaction data can be modified and stored as the test content. The test system executes the test case to generate a result, and the result can be compared against what is expected based on the test content.

15 Claims, 5 Drawing Sheets

OTHER PUBLICATIONS

Mercury, "Automating Performance Testing for Predicting System Behavior and Performance", *Copyright 2006 Mercury Interactive Corporation* WP-1083-1106; www.mercury.com.

Mercury, "Mercury Business Process Testing: Test Automation Focused on your Business", *Copyright 2004 Mercury Interactive Corporation* WP-1048-0105; 14 pages www.mercury.com.

Non-Final Office Action for U.S. Appl. No. 11/251,281, Mailed Jan. 22, 2009, 24 pages.

Notice of Allowance and Fees for U.S. Appl. No. 11/251,281, Mailed Feb. 22, 2010, 10 Pages.

International Search Report & Written Opinion mailed May 15, 2008 for International Application No. PCT/US06/40390.

Non-Final Office Action dated May 8, 2008 for U.S. Appl. No. 11/251,281.

Final Office Action for U.S. Appl. No. 11/251,281, Mailed Jul. 24, 2009, 27 pages.

Final Office Action mailed Sep. 19, 2008 for U.S. Appl. No. 11/251,281.

Non-Final Office Action for U.S. Appl. No. 11/868,897, Mailed Jul. 29, 2010, 14 Pages.

Notice of Allowance and Fee for U.S. Appl. No. 11/868,897, Mailed Jan. 7, 2011, 7 Pages.

Notice of Allowance for U.S. Appl. No. 11/511,984, Mailed Jun. 23, 2011, 16 pages.

* cited by examiner

TEST DATA MANAGEMENT

This application claims priority to pending Provisional Patent Application No. 60/828,764 filed on Oct. 9, 2006 and entitled "Adaptive Business Process Change Verification".

FIELD

Embodiments of the invention relate to verifying business process changes, and more particularly to business process test case composition with componentized test case building blocks.

BACKGROUND

Businesses increasingly rely on business processes to accomplish various tasks within the organization. The business software that is used to implement the business processes becomes critical to the organization. Some software (e.g., SAP business software of SAP AG of Walldorf, Germany) allows customization and modification of the business process applications. Changes to the business processes may be made frequently (e.g., quarterly) in some organizations. Prior to implementing a change in the business process software, the organization would ideally verify/validate the change to ensure the change accomplishes what is desired, and does so correctly without interruption to the normal flow of the organization. However, current methods of verification of the business process changes are expensive, time-consuming, and often require tradeoffs between reliability and cost and/or time.

Currently, business software is tested in one of two ways: manually, or via record and playback/scripting. Manual testing suffers from being very time consuming and having a small scope of possible tests. The risk that an error will "make its way through" the testing is relatively high. The inefficiency and cost aspects to manual testing makes manual testing a generally unacceptable procedure. Automated tests are generally considered to improve quality, but generating and maintaining test content is traditionally time consuming and expensive.

Test content is traditionally generated to recreate scenarios and processes that occur in normal execution of the execution system. Thus, test content traditionally must be created with configuration and data inputs to simulate a real transaction. However, accurately creating test content can be difficult. Where test content can be accurately created, it is typically costly to generate and maintain.

SUMMARY

Methods and apparatuses enable generating test content for test system from an executed transaction of an execution system. The data resulting from the execution of the transaction in the execution system is accessed and used to generate test content for a test case. The test case can include the transaction data unmodified, or the transaction data can be modified and stored as the test content. The test system executes the test case to generate a result, and the result can be compared against what is expected based on the test content.

In one embodiment, the transaction data is distributed across multiple systems. In one embodiment, accessing the transaction data may refer to accessing a data container that references data objects distributed across multiple systems or stored in different locations of a single system. The transaction data may be a posted document that provides parameters and results of a business process transaction associated with the transaction data.

The correct execution of the business process and correct database update of the test system is evaluated based on comparing the results of the test system with the transaction data as the test data against an expected result. The expected result may be a successful execution. In one embodiment, the actual transaction data may produce an error in the execution system, and a similar error may be expected in the test system. The transaction data may be modified to produce an expected error, and such an error may be tested for in the test system.

BRIEF DESCRIPTION OF THE DRAWINGS

The following description includes discussion of figures having illustrations given by way of example of implementations of embodiments of the invention. The drawings should be understood by way of example, and not by way of limitation. As used herein, references to one or more "embodiments" are to be understood as describing a particular feature, structure, or characteristic included in at least one implementation of the invention. Thus, phrases such as "in one embodiment" or "in an alternate embodiment" appearing herein describe various embodiments and implementations of the invention, and do not necessarily all refer to the same embodiment. However, they are also not necessarily mutually exclusive.

Figure 1:
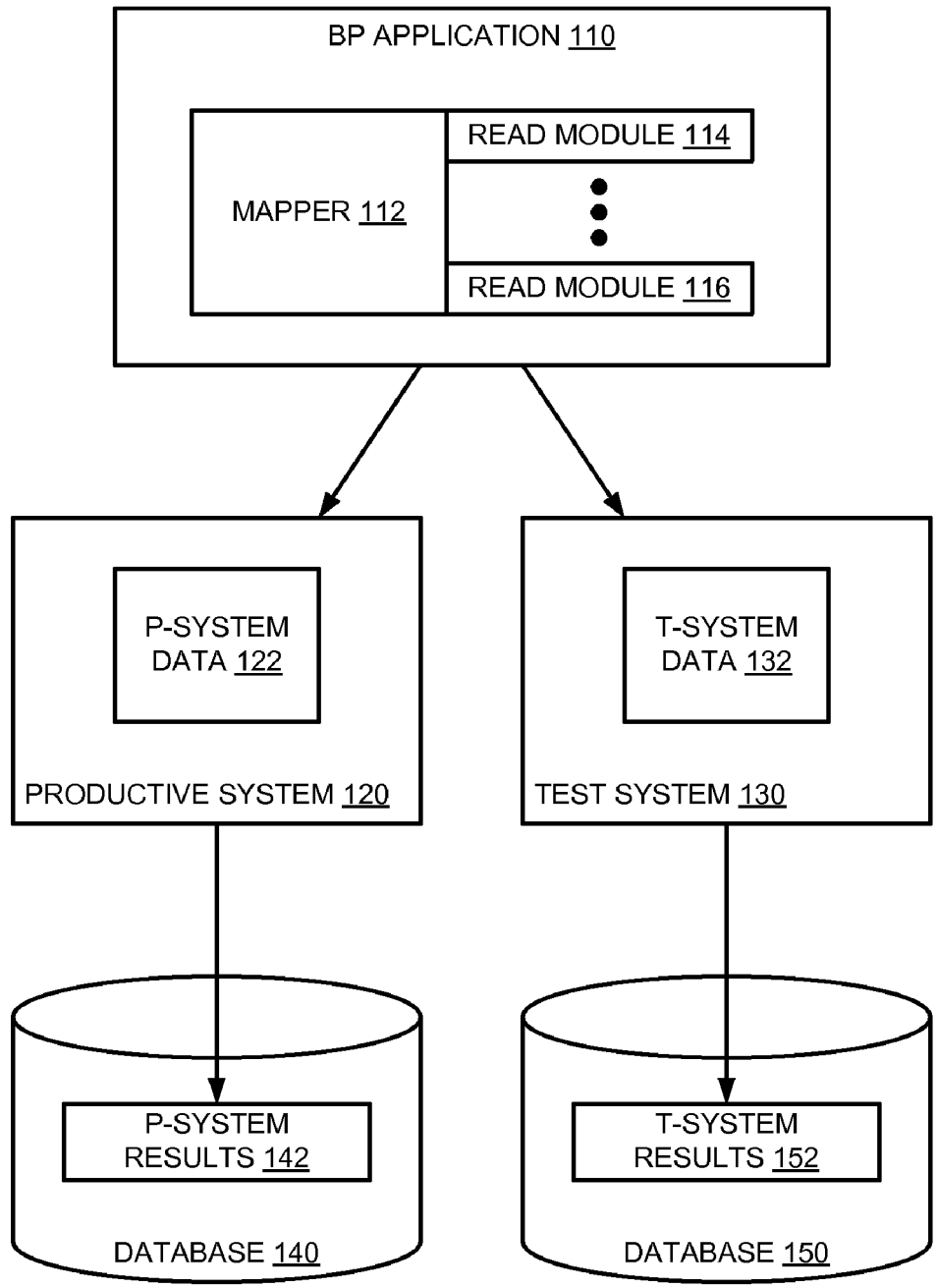
FIG. 1 is a block diagram of an embodiment of a system that performs a test with data from a productive system.

Descriptions of certain details and implementations follow, including a description of the figures, which may depict some or all of the embodiments described below, as well as discussing other potential embodiments or implementations of the inventive concepts presented herein. An overview of embodiments of the invention is provided below, followed by a more detailed description with reference to the drawings.

DETAILED DESCRIPTION

As provided herein, a test system is able to access transaction data of an executed transaction, and generate a test case from the transaction data. In contrast to traditional methods of test data creation via manual preparation of data, or copying and saving data as a test data file, the test suite can access posted transaction data and execute the test case with the transaction data as test data. In one embodiment, the transaction data is simply identified to the test suite, which may then access and use the data as test data, rather than accessing a test file, for example. In one embodiment, the transaction data is a posted document, which refers to a data container that includes an identifier and references to multiple data elements in one or more databases/systems.

The posted document not only includes the data of an already executed transaction, but it will also include the correct fields and formatting or semantics, removing the need for creating the fields and formatting or semantics in a test case.

The fields refer to separate data interface points (input and/or output for user consumption and/or interaction) within a display screen. The formatting or semantics refers to the form and content of data required for a particular system or service to be accessed in execution of the business process to be executed in the execution system or to be tested in the testing system.

The posted document may be the result of a successful transaction, which would be expected to generate a successful result from the testing. Additionally, the posted document may act as a starting point for test data, and the posted document modified to create the test data. Furthermore, the posted document could be the result of a "test transaction" that causes an error in the original system, and would be expected to result in the same or similar error in the test system. Alternatively, the test system could be designed to correct such an error, and be expected to handle the transaction without error, in contrast to the previous execution system (and thus no error would occur on the "test transaction" that caused an error in the execution system).

In one embodiment, the original posted document acts as a starting point for test execution data labeled as "negative" data. The original document that allowed the business transaction to successfully finish the transaction represents "positive" data, and negative test data will cause the target system to fail at a defined step. With such defined negative test data, the test administrator can ensure the system will respond with an error message or warning in case of incomplete or faulty data. Verifying the generation of the error message or warning can be highly important to test so called "automated controls" built into an ERP (Enterprise Resource Planning) application, whether an application from SAP, Oracle Corporation of Redwood Shores, Calif. Negative test data ensures that the control gets activated and stops the transaction, which behavior cannot be tested with positive test data. Negative test data can be generated as simply as changing one or two field values from the original posted document while leaving all other data as correct.

FIG. 1 is a block diagram of an embodiment of a system that performs a test with data from a productive system. System 100 represents an enterprise system, which includes computer and hardware resources for a business or other organization. As shown, system 100 includes productive system 120, and test system 130. As used herein, a "productive system" refers to physical and/or virtual resources that host and execute one or more of an enterprise's business processes. There may be more than a single productive system within an organization. Hosting and executing the business processes may include mechanisms for creating, maintaining, storing, modifying, accessing, etc., a business process. As used herein, a "test system" refers to physical and/or virtual resources that provide a test environment to execute a "test version" of a business process. A test version of a business process does not result in a change to the enterprise data accessed during or otherwise associated with execution of the business process. While some overlapping resource use may be exist between productive system 120 and test system 130, there are some non-overlapping resources at least at a control level. Thus, productive system 120 and test system 130 are separate at least in that control logic or management of the two systems is different.

Productive system 120 may also be referred to as a "P-system," and test system 130 may also be referred to as a "T-system." P-system 120 executes a system from resources accessed from an enterprise backend system. P-system 120 may also execute based on data input, such as from a user or an automated source or a service. Such data resources are represented as P-system data 122. T-system 130 may also access data from an enterprise backend, and/or from input from other sources, and such data is represented as T-system data 132. As described herein, T-system data 132 is derived from the posted data of a business transaction executed in P-system 120.

In one embodiment, T-system data 132 can be considered to be test base content, which is test data derived from data that exists within system 100. In one embodiment, the base content represents a "previously-known-good" version or a previously tested version of a business process or application where the execution results are known. In one embodiment, "known-bad" data may be used in the test system, referring to data with a known or expected error or result. Such data may be the result of a failed transaction, or a modified executed transaction. As provided herein, accessing and using the previous transaction data is contrasted to simply accessing electronic data to supply data for a test case. In one embodiment, the data from the executed transaction is not simply accessed, but linked to the test case. For example, rather than pulling data and generating a list of fields to which to apply the data, the data is simply linked to the test case, so the test case can actively access the data itself. Thus, in contrast to generating a test case by accessing data itself, the test case can have one or more identifiers linked to it or associated with it, which enables the test system to obtain the data for execution. Rather than pulling data for the test case from a database of records (data) during test execution, the actual data may be accessed.

Business process (BP) application 110 represents an application in which one or more business processes are executed. To support execution of an executed transaction, in one embodiment, BP application 110 includes mapper 112 with multiple read modules 114-116. Traditional BP applications are unable to recognize the data structure of the transaction data. Thus, traditional applications would be unable to execute a test case having transaction data as the test data. Mapper 112 provides the ability to recognize the data structure of the various pieces of data that represent the executed transaction results (as may be provided in an executed transaction document). In one embodiment, BP application 112 includes multiple mappers, each with multiple read modules, one mapper for each different data type (e.g., object class) with read modules for the various types of methods and interfaces of the data. With mapper 112 and read modules 114-116, BP application 110 can access the various elements of data stored in one or many systems that result from execution of P-system data 122 in P-system 120.

When P-system 120 executes a business process with P-system data 122, the P-system generates P-system results 142, from which T-system data 132 is derived. P-system results 142 may be generated throughout the execution of the associated business process or end-to-end application. That is, data may be stored each time input is provided to P-system 120 and business logic executed to generate a result. Thus, results may be stored across multiple different systems, and all identified as part of a particular transaction. A data container can simultaneously be updated (assuming it is already generated—the data container can be generated at the beginning of the transaction or when results begin to be generated) with the results data. The data container can then store a reference to the data, which can be identified with an identifier associating the data with the data container. Linking the data container to a test case in T-system 130 can link all the referenced data to the test case.

Execution of the process in T-system 130 with T-system data 132 will also result in the generation of test results, as depicted by T-system results 152. T-system results 152 will typically be stored in a different database 150 from P-system results 142. Databases 140 and 150 represent one or more databases that are part of enterprise system 100. In one embodiment, test results are stored in a separate virtual system from P-system results. Thus, the results of the T-system execution (execution of the test case) may be stored on the same or separate hardware systems as the P-system results, as well as the same or separate logical systems as the P-system results.

Figure 2:
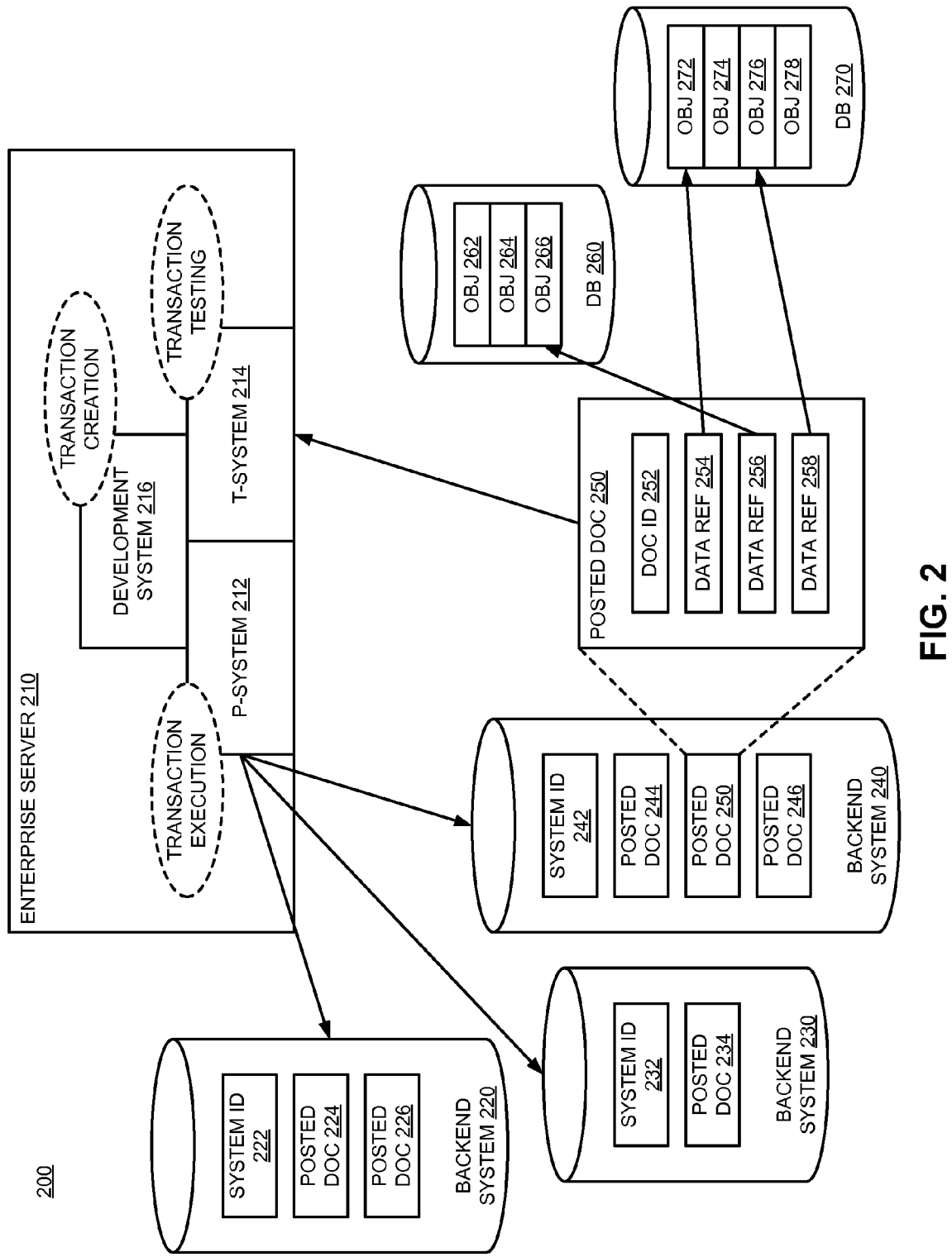
FIG. 2 is a block diagram of an embodiment of a system that manages posted transaction data to use the data for test purposes.

FIG. 2 is a block diagram of an embodiment of a system that manages posted transaction data to use the data for test purposes. System 200 represents an enterprise system, such as system 100 of FIG. 1. System 200 includes enterprise server 210, which represents hardware and software elements that serves data and/or applications to end-user (front-end) software in the enterprise. Enterprise server 210 may provide data from multiple systems to one or more user devices (not shown). For example, P-system 212 represents a productive system or an execution system, referring to a system in which the enterprise's work is accomplished. Thus, P-system 212 is responsible for transaction execution. T-system 214 represents a test system, which is responsible for transaction testing. The transaction testing can be for testing changes to the underlying logic or configuration of a system intended for use in P-system 212. Prior to rolling the system over to the P-system, the target system is tested for accuracy. The system can be tested by performing transactions in the system. As described herein, T-system 214 is able to access executed transaction data (e.g., posted document 250) to test the target system. Development system 216 represents a development system where transactions are created, and where system development occurs (the target system is created in the development system).

As illustrated, any number of transactions may be performed in P-system 212. Depending of the size and operation of the company, the number of transactions may be dozens, or even thousands per day. In one embodiment, each transaction result is stored in one or more backend systems 220-240. Each transaction result is depicted as a posted document (doc), such as 224, 226, 234, 244, 250, 246. As illustrated, each posted doc is a data container that is stored in a particular backend system, although the underlying data that is part of the transaction results may be stored in any of a number of backend systems. Thus, posted doc 234, for example, may reference data stored in any of backend systems 220-240.

Each backend system may include a system identifier (ID), 222, 232, 242, which represents a unique identifier within system 200 for the backend system. In one embodiment, each posted document may be located with reference to the system ID and the posted document ID for the document. For example, posted document 224 may be identifiable by reference to system ID 222 (e.g., CRM_ID (customer relationship management identifier)) and the ID associated with posted document 224 (e.g., CRM_DOC_123). Linking the posted documents may be performed by referencing the system and document IDs for the desired transaction data. Such information may be provided by a user or administrator who is configuring the test system.

As illustrated, posted document 250 is shown expanded having document ID 252 (such as CRM_DOC_123), and data references 254-258. Data references can point to any system, storage, database, etc., within the enterprise. As shown, data reference 254 points to object 272 of database (DB) 270, data reference 256 references object 266 of database 260, and data reference 258 references object 276 of database 270. Such is meant only as an example, and any number of associations may be created.

Posted document 250 is the result of execution of a transaction in P-system 212, and which can be referenced within T-system 214 to link the document into the test case. By linking in the test case, the data itself may be accessible to the test system.

Figure 3:
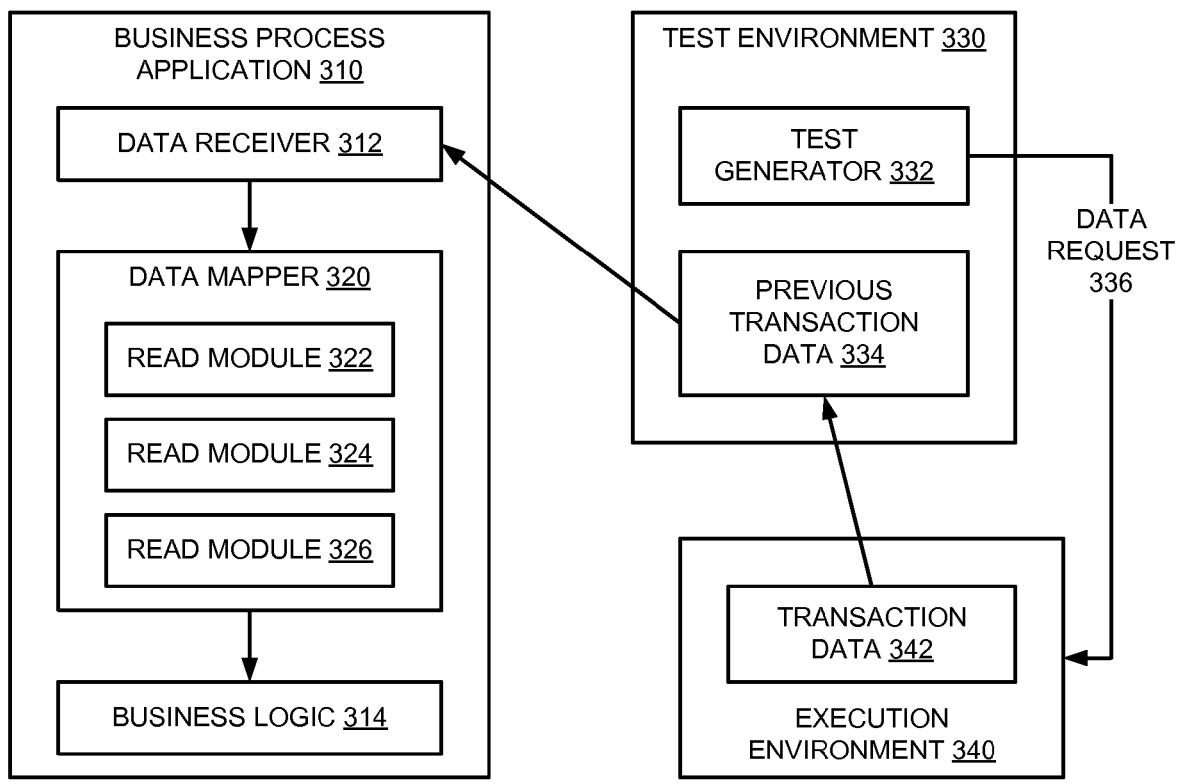
FIG. 3 is a block diagram of an embodiment of a system with a test environment that obtains previous transaction data as test data.

FIG. 3 is a block diagram of an embodiment of a system with a test environment that obtains previous transaction data as test data. System 300 represents an enterprise system according to any embodiment described herein. System 300 includes business process application 310, which provides an execution environment for a business process transaction. Business process application 310 includes data receiver 312, which represents logic to receive data for execution. In the case of executing a test case, such data may be data from a previous transaction execution.

Data mapper 320 of business process application 310 represents logic that is able to interpret the semantics of particular data types. Data mapper 320 includes read modules 322-326, which represent an arbitrary number of read modules that provide data access and manipulation functionality to data mapper 320. In one embodiment, the read modules include interfaces, such as agent interfaces or application programming interfaces (APIs) that can send requests and receive information from a particular data element. Note the implementation of the data mapper and associated read modules is significantly different than what is previously known. In previous systems, the business process application would simply be passive, and receive data that already included the correct semantics. As depicted, the business process application is able to execute the test case by accessing the appropriate data, and interpreting the data (via the read modules) for use in the test case transaction.

Business process application 310 also includes business logic 314, which represents the business logic associated with the business process application. Business logic 314 enables business process application 310 to perform operations on the data, including the execution of algorithms, the calling of methods and routines, the invoking of interfaces, etc. Business logic 314 allows the manipulation and use of data to achieve a business result (e.g., in one simple example consider receiving an input value representing an order for a particular identified part number, and creating a purchase order (PO) for the input).

System 300 includes test environment 330, which represents a test suite or one or more components of a test suite that enables the execution of tests on business process application 310. Note that in one embodiment, business process application 310 exists as a logical entity, and not as a particular defined software application to be loaded and executed. That is, an application as used herein may refer to an access program (e.g., a browser) that has a defined flow of logic from one phase or function to another, which may execute a particular business process. Thus, test environment 330 may provide test data and a test flow, which represents the flow of a transaction to be tested.

Test environment 330 may include test generator 332, which represents one or more functional modules that accesses transaction data (e.g., via a transaction data container) to provide previous transaction data 334 as test data to data receiver 312 of business process application 310. Test generator 332 may generate data request 336, which requests the transaction data identified by whatever identifiers are required in the system, such as document ID and system ID. Execution environment 340 represents the management of the execution system, including management of the results data generated in execution of a transaction. Thus, transaction data 342 represents the data created via execution of the transaction in a business transaction. In one embodiment, transaction data 342 is linked as part of a test case, which then includes the transaction data as data available for execution in a test system.

Figure 4:
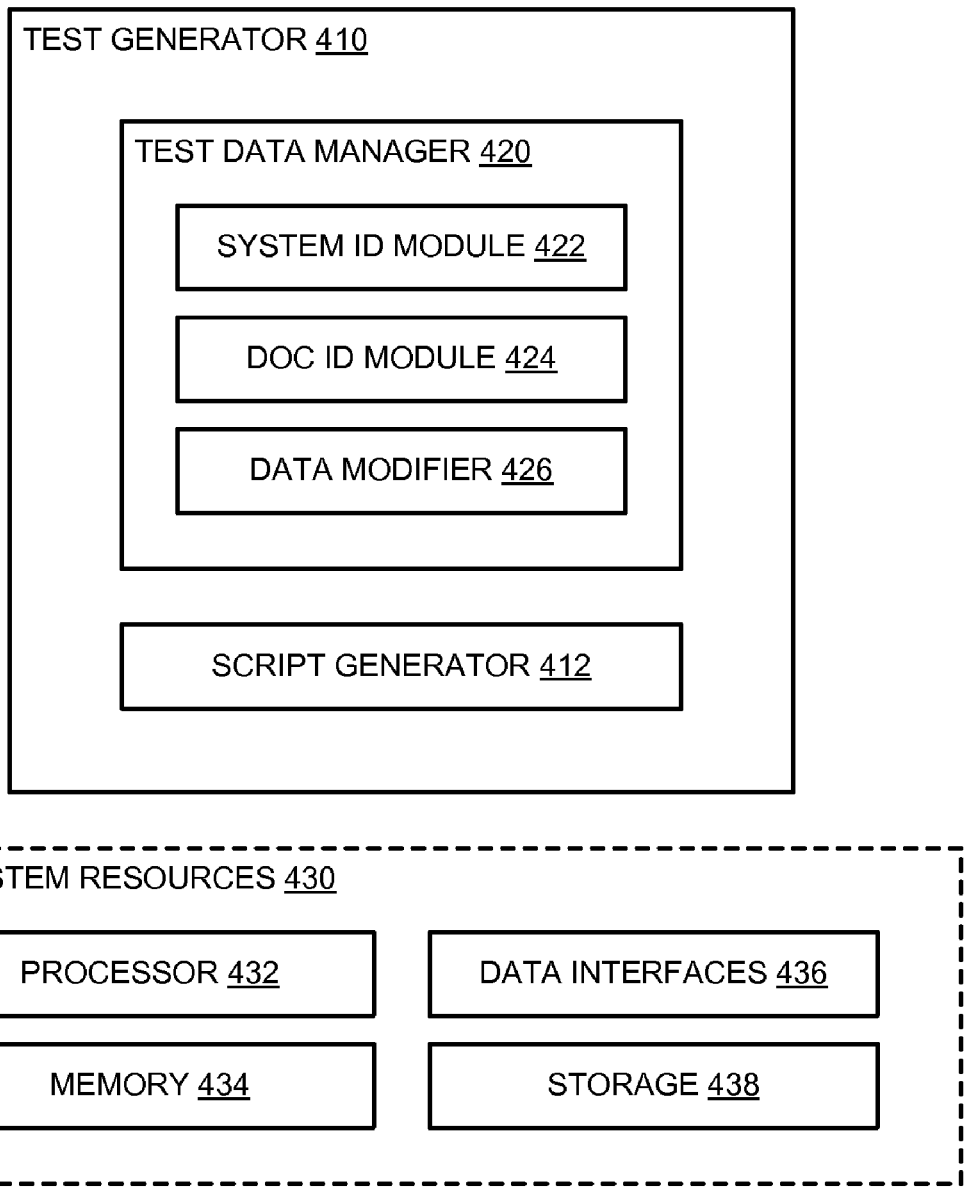
FIG. 4 is a block diagram of an embodiment of a test execution data generator.

FIG. 4 is a block diagram of an embodiment of a test execution data generator. System 400 represents the functional components of a test system. The components may exist as standalone components, or may exist as logical components on shared or dedicated resources. Thus, system 400 includes test system resources 430, which represent hardware and driver components for the test system. Such components may include, but are not limited to, processor 432, memory 434, data interfaces 436, and storage 448.

Processor 432 represents one or more processing elements, including general purpose processors, and/or specialized hardware microprocessor or microcontrollers. Processor 432 may also represent multi-core and virtual machine technologies that can be employed within the enterprise. Memory 434 represents (generally volatile) storage of instructions and data for execution by processor 432. Data interfaces 436 represent agent and APIs that provide access to data. Data interfaces 436 may also include the physical interconnects and support logic used to communicate with other systems to access data. Storage 438 represents non-volatile storage (i.e., the data values are retained despite an interruption of power to the storage device). Program code and management logic may be included within storage 438.

System 400 includes test generator 410, which includes test data manager 420. Test data manager 420 is an abstraction of logic and functional modules that provide the functionality to test data manager 420. Such logic may be included within a single component, or may be distributed over various components. For example, system ID module 422 enables test data manager 420 to identify and locate a system where transaction data is stored. The particular system identified is the system that stores the data or data container for transaction data that will be referenced in a test case created by test generator 410. System ID module 422 may include user interface components (e.g., a prompt, or an input field/box, etc.) to allow a user to specify transaction data to be used as test data.

Document ID module 424 enables test data manager 420 to identify and locate particular transaction data resulting from execution of a transaction in the productive system. In one embodiment, the document is identified by a user, and the test system is able to locate an associated system via a location mechanism (e.g., a search, a query system, a lookup table, etc.) available within system 400. In one embodiment, a user specifies both the document and the system. Note that the document ID can be a unique identifier for the entire enterprise system (e.g., a GUID (global unique identifier)), or may be an identifier unique within a particular system.

In one embodiment, test data manager 426 includes data modifier 426, which enables test data manager 426 to modify execution data prior to providing the test case for execution. In one embodiment, modifications are recorded in a file, description, table, or data structure that is included within the test case. Thus, the test case may include test specifics based on "changes" made to linked or referenced data. In another embodiment, modifications are stored in a separate file or data structure and linked into the test case. Thus, changes data can be accessed as execution data is accessed. In one embodiment, a copy of a data container representing the transaction data is made, with changes made to the data container. For example, one or more of the transaction results may be replaced with different data stored in a system and referenced in the copied "test transaction data" copy. In such an implementation, the test data may be an exact copy of the transaction results data, or a modified version or otherwise based on or derived from the transaction data. Other methods of changing the transaction data for use in the test system may be employed.

In one embodiment, changes to accessed execution data are performed manually by a user. That is, one or more aspects of the data are changed by manipulation of the data such as in a test development environment. The modified data can then be stored as the test data. In one embodiment, accessed execution data can be modified automatically from the test suite via business logic built into the test suite. Thus, the test system can be created to automatically make a change to test data upon a particular input by the user, or when accessed execution data has a particular property.

In one embodiment, test generator 410 includes script generator 412, which may generate a test script that is derived from the flow of the transaction data. Note that it may not be necessary in all cases to generate a test script when using the transaction data. For example, the transaction data may act as a flow manager for a test transaction, which may require in-test processing of data to determine what operation to perform next. Alternatively, the flow of the transaction can be extracted and generated for the test case, which can then call the data as needed to provide configuration and input parameters for execution the test case. Other than the details provided herein, script generation in test systems is known and will not be discussed in detail.

Various components described herein may be a means for performing the functions described. Each component described herein includes software, hardware, or a combination of these. The components can be implemented as software modules, hardware modules, special-purpose hardware (e.g., application specific hardware, application specific integrated circuits (ASICs), digital signal processors (DSPs), etc.), embedded controllers, hardwired circuitry, etc. Software content (e.g., data, instructions, configuration) may be provided via an article of manufacture including a machine readable medium, which provides content that represents instructions that can be executed. The content may result in a machine performing various functions/operations described herein. A machine readable storage medium includes any mechanism that provides (i.e., stores) information in a form accessible by a machine (e.g., computing device, electronic system, etc.), such as recordable/non-recordable media (e.g., read only memory (ROM), random access memory (RAM), magnetic disk storage media, optical storage media, flash memory devices, etc.). The content may be directly executable ("object" or "executable" form), source code, or difference code ("delta" or "patch" code). A machine readable medium may also include a storage or database from which content can be downloaded. A machine readable medium may also include a device or product having content stored thereon at a time of sale or delivery.

Figure 5:
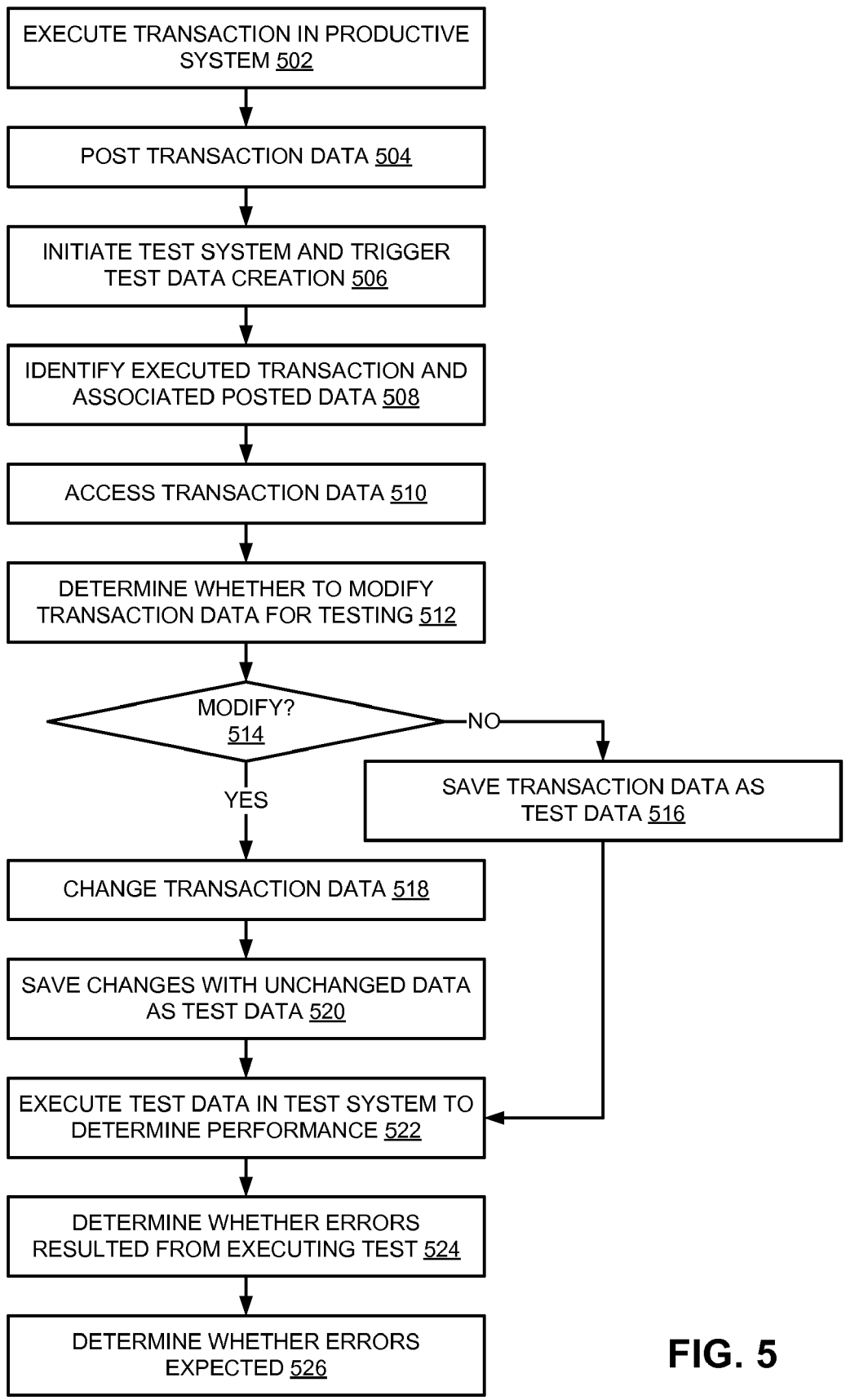
FIG. 5 is a flow diagram of an embodiment of a process for generating test data from previous transaction data.

FIG. 5 is a flow diagram of an embodiment of a process for generating test data from previous transaction data. Flow diagrams as illustrated herein provide examples of sequences of various process actions. Although shown in a particular sequence or order, unless otherwise specified, the order of the actions can be modified. Thus, the illustrated implementations should be understood only as an example, and the process for establishing the secure channel can be performed in a different order, and some actions may be performed in parallel. Additionally, one or more actions can be omitted in various embodiments of the invention; thus, not all actions are required in every implementation. Other process flows are possible.

Within an enterprise, a worker executes a transaction in a productive system, 502, as part of the course of business. In one embodiment, part of the execution of the transaction is the posting of transaction data, 504, which represents the transaction and its parameters. The transaction data includes all necessary fields and is already formatted according to the proper semantics for use in a system. The transaction data also reflects actual data values within the proper parameters of the system, which need not be further verified or changed if the desired result is to produce the result in the test system that was generated in the productive system.

Either the same or a different user (generally a different user, such as an administrator or quality assurance (QA) expert) initiates the test system and triggers test data creation, 506. Initiating the test system may include providing an indication of backend systems to enable the test system to discover the systems for later data access. In one embodiment, initiating the test system refers to instantiating a test from a test class. Triggering the test data creation may be part of initiating the system—it requires data to execute.

The system, via indication from the user, identifies one or more executed transactions and associated posted data documents for the transactions, 508. The user identifies the posted data documents by a reference identifier. Note that thousands of P-system documents are likely to exist in a real-world implementation of the systems described herein. The ability to search the system via reference number of the posted data documents enables the user (e.g., QA expert) to efficiently locate appropriate P-system documents suitable for use as test execution data. In one embodiment, the search capability provides complex search support, allowing a user to provide key word/concept searches that will identify any of multiple posted documents that may be suitable as test data. Thus, the test system can provide a mechanism for a user to generate an input query and perform a search based on the query. The search results (e.g., a list) can then be presented to a user who selects the appropriate posted data documents.

Whether selected manually or with assistance from a search query, the test system can then access test transaction data, 510. Note that actual access of the data may not occur until execution of the test. However, in one embodiment, data can be presented to a user for review prior to using the data for testing purposes. In such a case, the system may determine, via the user, whether to modify the transaction data for testing, 512. If data does not need to be accessed at this point, the system may be configured to not access any data, and wait until data is requested for a test execution scenario. If the decision is to not modify the data, 514, the system saves the transaction data as the test data, 516. As discussed above, there may not be any actual data access at such a point in time. "Saving" the transaction data may refer merely to the system referencing the data within its test case, and need not imply accessing and storing actual data values.

If data is to be modified, 514, the relevant portion(s) of the transaction data are changed within the test environment, 518. The changes can be saved according to any mechanism described above, or other mechanisms not listed, with the unchanged data base content, 520. The entirety of the base content and the changes is the test data for the test system. Whether or not the data is modified, the test suite provides the test data to the test system, which executes the test data in the test system to evaluate or determine a performance of the test system, 522. In one embodiment, the test system is expected to behave identically to the execution system. In one embodiment, the test system results are expected to vary from the transaction data results in certain ways. All results expectations can be programmed into the test system for evaluation of the test performance. Also, comparing results to expectations can be performed manually.

The evaluation includes determining whether errors results from execution of the test data, 524. The evaluation also includes determining whether or not errors were expected, 526. Thus, if errors were not expected but resulted from execution of the test case, the test system may be considered to have failed the test. If error were expected but did not result, such performance may also represent a failure of the test system. Thus, performance should match expectations for a successful end result of the target test system.

Besides what is described herein, various modifications may be made to the disclosed embodiments and implementations of the invention without departing from their scope. Therefore, the illustrations and examples herein should be construed in an illustrative, and not a restrictive sense. The scope of the invention should be measured solely by reference to the claims that follow.

What is claimed is:

1. A computer implemented method comprising:
   accessing a data container of posted transaction data created as part of execution of a business process transaction in a business process application in an execution system, the data container including an identifier and reference to data objects of at least one enterprise database, wherein the posted transaction data provides parameters and results of an already completed business process transaction, which are created by the execution system as part of execution of the business process transaction;
   generating a test case in a test system with the transaction data as the test data, the test system separate from the execution system, the generating including converting the posted transaction data to formatted test data by semantic mappings of posted transaction data fields; and
   executing the test case in the test system to generate a test result.

2. The method of claim 1, wherein generating the test case further comprises:
   modifying one or more aspects of the accessed transaction data.

3. The method of claim 2, wherein modifying the accessed transaction data comprises:
   modifying the accessed transaction data in response to one or more of manual input from a user or business logic that modifies the accessed transaction data.

4. The method of claim 1, wherein generating the test case further comprises:
   linking the transaction data to the test case.

5. The method of claim 1, further comprising:
   executing the business process transaction in the execution system with data that produces an execution result in the execution system; and
   comparing the test result with the execution result to evaluate a performance of the test system.

6. The method of claim 5, wherein the execution result comprises an execution error, and wherein comparing the test result with the execution result to evaluate the performance of the test system comprises:
   determining whether the test system generates an error similar to the execution error.

7. The method of claim 5, wherein the execution result comprises an execution error, and wherein comparing the test result with the execution result to evaluate the performance of the test system comprises:

determining whether the test system generates a valid output instead of the execution error.

8. The method of claim 1, wherein accessing the transaction data comprises:
receiving an input query;
presenting query results identifying one or more posted documents to a user; and
accessing a selected posted document from the query results.

9. An article of manufacture comprising a machine-readable storage medium having content stored thereon to provide instructions to cause a machine to perform operations including:
accessing a data container of posted transaction data created as part of execution of a business process transaction in a business process application in an execution system, the data container including an identifier and reference to data objects of at least one enterprise database, wherein the posted transaction data provides parameters and results of an already completed business process transaction, which are created by the execution system as part of execution of the business process transaction;
generating a test case in a test system with the transaction data as the test data, the test system separate from the execution system, the generating including converting the posted transaction data to formatted test data by semantic mappings of posted transaction data fields; and
executing the test case in the test system to generate a test result.

10. The article of manufacture of claim 9, wherein the content to provide instructions for generating the test case further comprises content to provide instructions for:
modifying one or more aspects of the accessed transaction data.

11. The article of manufacture of claim 9, wherein the content to provide instructions for executing the test case further comprises content to provide instructions for:
executing the business process transaction in the execution system with data that produces an execution result in the execution system; and
comparing the test result with the execution result to evaluate a performance of the test system.

12. The article of manufacture of claim 11, wherein the execution result comprises an execution error, and wherein the content to provide instructions for comparing the test result with the execution result to evaluate the performance of the test system comprises content to provide instructions for:
determining whether the test system generates an error similar to the execution error.

13. A test system comprising: a processor to execute test system components:
means for accessing a data container of posted transaction data defining a result of execution of a business process transaction in a business process application in an execution system, the data container including an identifier and reference to data objects of at least one enterprise database, wherein the posted transaction data provides parameters and results of an already completed business process transaction, which are created by the execution system as part of execution of the business process transaction;
means for storing the transaction data as test content for a test case in a test system separate from the execution system, including converting the posted transaction data to formatted test data by semantic mappings of posted transaction data fields; and
means for executing the test case in the test system to generate a test result.

14. The system of claim 13, further comprising:
means for modifying one or more aspects of the loaded transaction data prior to generate modified transaction data for storing as test content.

15. The system of claim 13, further comprising:
means for monitoring execution of the test case in the test system for an expected error, the expected error based on an error that occurs in execution system with the transaction data.

* * * * *